Feb. 5, 1952 H. E. SLOAN 2,584,747
SWIVEL CONNECTION FOR AIR OPERATED CHUCKS
Filed March 1, 1950
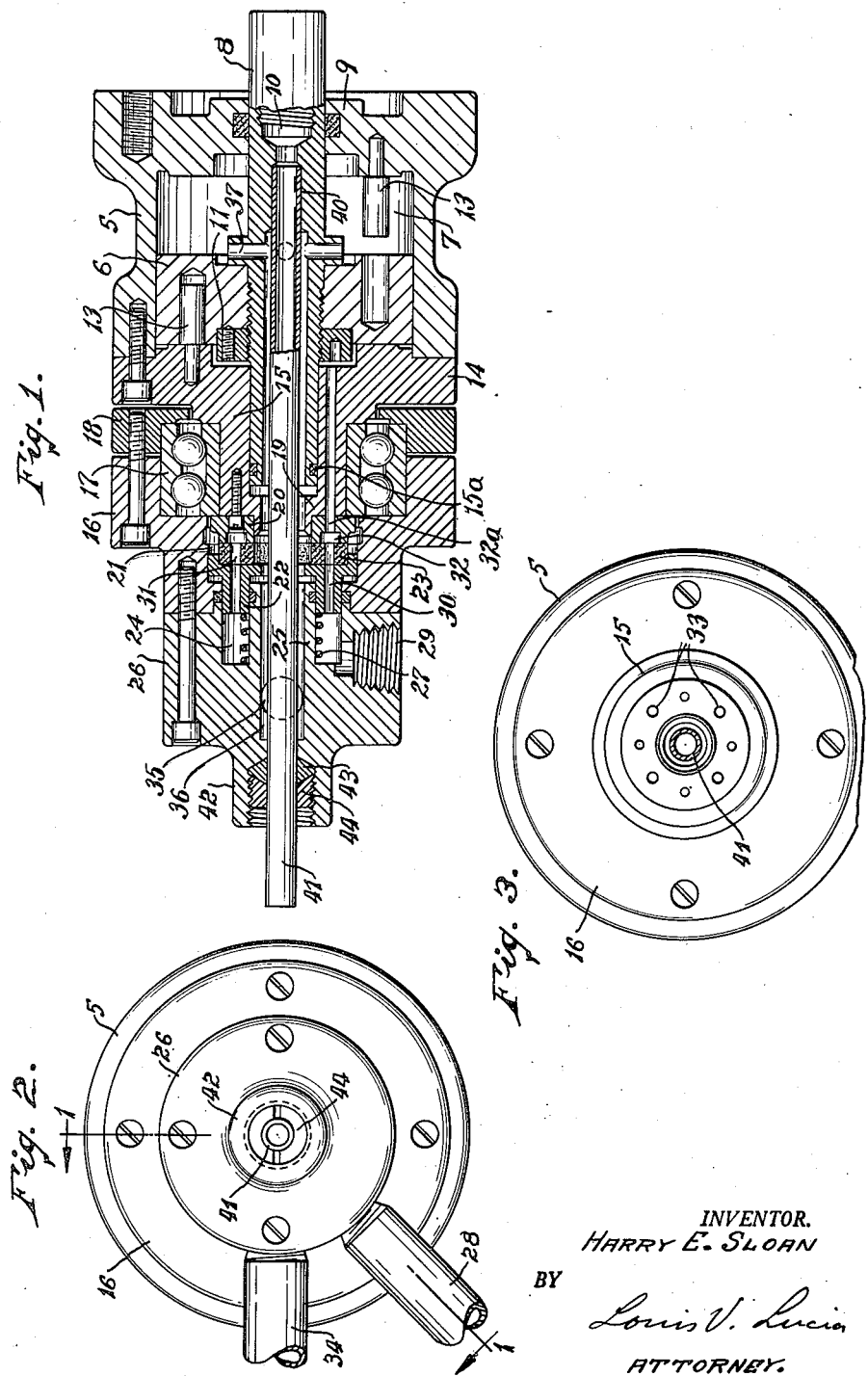
INVENTOR.
HARRY E. SLOAN
BY
*Louis V. Lucia*
ATTORNEY.

Patented Feb. 5, 1952

2,584,747

UNITED STATES PATENT OFFICE 2,584,747

SWIVEL CONNECTION FOR AIR OPERATED CHUCKS

Harry E. Sloan, Hartford, Conn., assignor to The Cushman Chuck Company, Hartford, Conn., a corporation of Connecticut Application March 1, 1950, Serial No. 146,944

4 Claims. (Cl. 121—38)

This invention relates to a swivel connection for air operated chucks and more particularly to such a connection as fully described in my co-pending application Serial No. 146,943, filed March 1, 1950.

As set forth in said co-pending application, my improved connection is particularly intended for use with air operated devices, such as chucks, which generally include a set of jaws that are opened or shut by means of a piston which is operated by pressure in a cylinder chamber which is connected to a source for said pressure through the swivel connection provided by my invention.

It is sometimes desired to provide an additional connection through the swivel so as to supply air for a different purpose than to operate the said jaws of the chuck, such as for blowing out chips from within the chuck, and the like.

It is an object of the present invention, therefore, to provide means in the said swivel connection whereby pressure may be supplied therethrough in a passage which is separated from the passages that communicate with the cylinder chamber.

A further object of this invention is to provide such a separate connection without requiring costly changes in the construction of the swivel connection.

Further objects and advantages of the present invention will be more clearly understood from the following description and the accompanying drawings in which:

Fig. 1 is a sectional side view, on line 1—1 of Fig. 2, illustrating an embodiment of the present invention.

Fig. 2 is an end view thereof.

Fig. 3 is an end view of the spindle portion of said connection.

As shown in the drawings, the numeral 5 denotes a cylinder which may be mounted on a machine in which an air chuck is to be operated in a conventional manner. This cylinder contains a piston 6 which is slidable within an air chamber 7 and is carried on a co-axial operating shaft 8 that slides through the end wall 9 of said cylinder and is connected, in a conventional manner, to the chuck in the machine on which the said swivel connection is used. This shaft 8 may be secured to a separate operating member that may be threaded to the internal thread 10 indicated in dotted lines on the said shaft, but the chuck and the connection between it and the shaft 8 are not shown for the reason that my invention is not necessarily limited for use with chucks exclusively.

The piston 6 is secured to the shaft 8 between a nut 11 and an annular flange 12 and rotation of the said piston within the chamber 7 may be prevented by studs 13—13 which project from the opposite ends of the chamber into recesses in said piston.

The said cylinder 5 is provided with a head 14 which has a projecting spindle portion 15 thereon within which the end of the shaft 8 is slidably positioned. A seal is maintained between the spindle and the shaft by means of a packing ring 15-a. A seal housing 16 is rotatably mounted on the spindle 15 by means of anti-friction bearings 17 which are secured to said housing by a clamping ring 18.

The said spindle portion 15 has a projecting end portion 19 upon which is positioned a sealing ring 20 that is secured to the end of the spindle portion 15 by means of screws as shown.

The housing 16 has therein a chamber 21 in which there is slidably contained a sleeve 22 which carries the sealing member 23 that is in the shape of a ring and is preferably constructed of a suitable sealing material, such as graphite or the like; the said sealing member being carried upon the end of the sleeve 22 and positioned between the said end of the sleeve and the surface of the seal engaging ring 20.

The sleeve 22 extends into an annular chamber 24 which surrounds a tubular projection 25 in a head 26 that is secured to the seal housing 16. A spring 27 is positioned within the said chamber 24 to urge the sleeve 22 into contact with the sealing member 23.

A pressure medium is supplied through said connection for the operation of the piston 6 and the conductor for said pressure medium includes a supply pipe 28 which is threaded to the opening 29 in the head 26 and communicates with the chamber 24. The said chamber communicates with one side of the piston 6 through a series of passages 30 in the sleeve 22, passages 31 in the sealing member, the annular groove 32 in the sealing ring, the passages 32-a in said sealing ring, and the passages 33 in the spindle 15 which extend into the chamber 7 at one side of the piston 6.

The said chamber 7 at the opposite side of the piston 6, is connected to the pressure supply by means of a pipe 34 which communicates with said cylinder through the opening 35, coaxial passages 36 in the head 26, the sleeve 22, the sealing member 23, the sealing ring 20, the spindle 15 and the shaft 8, and through radial passages 37 in the flange 12.

From the above description, it will be understood that, when it is desired to operate a device such as a chuck, or other mechanism with which my improved swivel connection is used, a pressure medium, such as air, may be supplied through the pipe 28, the chamber 24, and the passages 30, 31, 32-a, and 33 into one end of the cylinder 7. This will force the piston 6 to the opposite end of the cylinder 7 and move therewith the shaft 8 which is connected by suitable means to the said device. When it is desired to operate the device in the opposite direction, air is supplied through the pipe 34, the co-axial passages above mentioned, and through the radial passages 37 into the said cylinder.

The passages 30, 31, 32-a, and 33 are provided in groups and the area of the entire group is equal to the area of the opening 29 through which the pressure medium is delivered into the passages. Also, the radial passages 37 are provided in a group, the total area of which at least equals the area of the opening 35 and the co-axial passages. This permits the full supply of pressure medium which passes through the openings 29 and 35 to be delivered into the cylinder chamber 7.

It will be noted that, by means of my above described invention, I have provided a swivel connection for pressure which includes a passage extending through the piston in a cylinder for delivering the pressure into said cylinder without requiring passages extending through the wall of the cylinder, as heretofore commonly used and as shown in the above mentioned co-pending application, in order to bypass the piston.

In accordance with the invention covered by this application, the co-axial passage in the shaft 8 is extended entirely through the said shaft and communicates with the threaded recess 10 in the end of said shaft which receives the connecting member used between the said operating shaft and the chuck to be operated thereby. In the use of this invention, the said connecting member is in the form of a tubular bar to provide a conductor for the pressure medium which is to be delivered to the chuck.

The said co-axial passage in the shaft includes a reduced portion 40 into which there is inserted a co-axial tube 41 that extends from said portion longitudinally through the connection described in my co-pending application.

In the embodiment of the present invention illustrated in the drawings, the head 26 is provided with a co-axial projection 42 in which there is contained a sealing ring 43 and a co-operating gland 44. The said tube 41 is preferably rigidly secured to the shaft 8 and is, therefore, rotatable with the spindle 15 and relatively to the housing 26.

It will be noted that the present invention provides a separate passage, in addition to those described and shown in my co-pending application, which extends through the tube 41 and the operating shaft 8 as shown.

In the use of the swivel connection described herein, pressure is supplied through the tube 41 and the shaft 8 directly to the particular location at which it is desired, while the pressure for operating the piston 6 is supplied to the cylinder 7 from the communicating passages connecting with the pipes 28 and 34 as hereinabove fully described.

I claim:

1. In combination with a cylinder having a piston slidable in a chamber therein, a spindle secured to said cylinder, a slidable operating shaft extending through the bottom of said cylinder and through said chamber and piston; the said piston being secured to said shaft, a housing journaled on said spindle, a seal on said housing and spindle, a co-axial chamber in said housing, a first co-axial passage in said operating shaft extending through said piston and communicating said co-axial chamber with the cylinder chamber at one side of the piston, a separate chamber in said housing, a passage extending parallel to the co-axial passage in the shaft and communicating said separate chamber with the cylinder chamber at the opposite side of the piston, and a separate inner passage co-axial with the first co-axial passage in the shaft and extending entirely through the said housing, spindle, cylinder and shaft.

2. An apparatus as set forth in claim 1 wherein the first co-axial passage extends entirely through the shaft and includes a reduced portion, and a tube which is inserted into said reduced portion and extends therefrom through the piston, spindle and housing.

3. An apparatus as set forth in claim 2 wherein the said tube is of a lesser outside diameter than the inside diameter of the co-axial passage to thereby provide a separate outer co-axial passage along the exterior of the tube for communicating the cylinder chamber with a pressure chamber in the housing.

4. The combination of a cylinder having a chamber therein, a piston slidable in said chamber, a spindle secured to said cylinder, an operating shaft slidable through the bottom of said cylinder and in said spindle, a housing journaled upon the spindle, a seal between said housing and the end of the spindle, a passage co-axial with said spindle and extending through said shaft, the portion of said co-axial passage in the shaft communicating with the cylinder chamber through radial openings in the shaft, a reduced portion in said co-axial passage of the shaft, and a tube of a lesser diameter than the said last-named passage secured within said reduced portion and projecting therefrom to thereby provide a separate inner co-axial passage extending through the said piston spindle and housing.

HARRY E. SLOAN.

REFERENCES CITED

The following references are of record in the file of this patent:

UNITED STATES PATENTS

| Number | Name | Date |
|---|---|---|
| 1,311,665 | Peck | July 29, 1919 |
| 2,486,016 | Fairhurst | Oct. 25, 1949 |